(12) United States Patent
Asa (10) Patent No.: US 7,791,336 B2
(45) Date of Patent: Sep. 7, 2010

(54) DISPLACEABLE MAGNETIC DETECTION DEVICE

(75) Inventor: Yukihiro Asa, Kodaira (JP)

(73) Assignee: ASA Electronic Industry Co., Ltd., Tokyo (JP)

( * ) Notice: Subject to any disclaimer, the term of this patent is extended or adjusted under 35 U.S.C. 154(b) by 463 days.

(21) Appl. No.: 10/566,018

(22) PCT Filed: Mar. 19, 2004

(86) PCT No.: PCT/JP2004/003756

§ 371 (c)(1),
(2), (4) Date: Jan. 5, 2007

(87) PCT Pub. No.: WO2005/010908

PCT Pub. Date: Feb. 3, 2005

(65) Prior Publication Data

US 2007/0188161 A1    Aug. 16, 2007

(30) Foreign Application Priority Data

Jul. 25, 2003    (JP)    ............... 2003-279511

(51) Int. Cl.
*G01V 7/14* (2006.01)
(52) U.S. Cl. ............... 324/207.26; 324/207.2
(58) Field of Classification Search .. 324/207.2–207.26
See application file for complete search history.

(56) References Cited

U.S. PATENT DOCUMENTS

| | | | | | |
|---|---|---|---|---|---|
| 4,188,605 | A | * | 2/1980 | Stout | 338/32 H |
| 4,443,716 | A | * | 4/1984 | Avery | 307/116 |
| 4,803,426 | A | * | 2/1989 | Odagawa et al. | 324/207.2 |
| 4,966,041 | A | * | 10/1990 | Miyazaki | 73/862.191 |
| 4,970,463 | A | * | 11/1990 | Wolf et al. | 324/207.2 |
| 5,003,363 | A | * | 3/1991 | Lachmann | 338/32 H |
| 5,233,295 | A | * | 8/1993 | Murata et al. | 324/207.2 |
| 6,060,969 | A | * | 5/2000 | Hufgard et al. | 335/207 |

(Continued)

FOREIGN PATENT DOCUMENTS

JP    44-14970 B1    11/1966

(Continued)

OTHER PUBLICATIONS

"Applications of magnetic position sensors"; Honeywell Sensor Products; Solid State Electronics; pp. 1-8; Date-not available.*

*Primary Examiner*—Jay M Patidar
(74) *Attorney, Agent, or Firm*—Michael A. Glenn; Glenn Patent Group (57) ABSTRACT

The purpose is to achieve size reduction, weight reduction and thickness reduction of a magnetic material detecting device (1). The device comprises a linearly displaceable magnet (12) and a Hall IC (14) for detecting the displacement of the magnet (12). When an iron piece (28) is positioned within a predetermined distance from the main body of the magnetic material detecting device (1), the iron piece (28) is strongly magnetized to attract the magnet (12) so that the latter is displaced toward the iron piece (28). Therefore, when the displacement of a magnet (14) is detected by the Hall IC (14), it is possible to detect the fact that the iron piece (28) has been positioned within the predetermined distance from the main body of the magnetic material detecting device (1).

6 Claims, 10 Drawing Sheets

U.S. PATENT DOCUMENTS

| | | | |
|---|---|---|---|
| 6,215,299 B1 * | 4/2001 | Reynolds et al. | 324/207.2 |
| 6,563,306 B2 * | 5/2003 | Sato | 324/207.2 |
| 6,633,158 B1 * | 10/2003 | Shen et al. | 324/207.26 |
| 6,940,274 B2 * | 9/2005 | Wakiyama et al. | 324/207.12 |
| 2004/0075426 A1 * | 4/2004 | Wakiyama et al. | 324/207.12 |

FOREIGN PATENT DOCUMENTS

| | | |
|---|---|---|
| JP | 58-19115 B2 | 1/1978 |
| JP | 58-1946 Y2 | 4/1978 |
| JP | 11-27352 A | 1/1999 |
| JP | 2003-151390 A | 11/2001 |

* cited by examiner

DISPLACEABLE MAGNETIC DETECTION DEVICE

FIELD OF THE INVENTION

The present invention relates to a magnetic material detection device and a mobile object detection system which are applicable to specifically automobiles, elevators, nursing-care equipments, home security systems, cellular telephones, disconnection detection systems, industrial robots and others.

BACKGROUND ART

Conventionally, a magnetic sensitive switch is described in JP-A 2003-151390. In this magnetic sensitive switch, a movable member and a coil spring are arranged in a switch case, the coil spring supports a movable member, and an upper end part of the movable member protrudes from an opening at the upper surface of the switch case. A Hall IC is arranged in the switch case. When the upper end part is pressed, a magnet fixed to the movable member moves downward, and an output signal of the Hall IC changes from "off" to "on".

However, the magnetic sensitive switch should be improved with respect to many aspects because requests on reduction in size, weight and thickness have increased. Specifically, improvement is effective if portability is necessary in case of such as cellular telephones, or if efficient use of limited space is necessary in case of such as bath assist devices and other nursing-care equipments.

Therefore, the purpose of the present invention is to reduce size, weight and thickness of the magnetic material detection device including a magnetic sensitive switch, a magnetic switch and a mobile object detection system.

DISCLOSURE OF INVENTION

To solve the problem above, the magnetic material detection device of the present invention comprises a linearly displaceable magnet, and detecting means for detecting displacement of the magnet, wherein the detecting means detects the position of the magnetic material outside the magnetic material detection device body within predetermined distance from said magnetic material detection device body.

In addition, the magnetic switch of the present invention comprises the magnetic material detection device, and output means for outputting detection signal when displacement of the magnet is detected by the detecting means.

In addition, the mobile object detection system of the present invention comprises the magnetic material detection device and a mobile object provided with the magnetic material.

DETAILED DESCRIPTION OF THE PREFERRED EMBODIMENT

Hereinafter, each embodiment of the present invention will be described with referent to the drawings. Same parts are assigned with the same signs in each drawings.

Figure 1A:
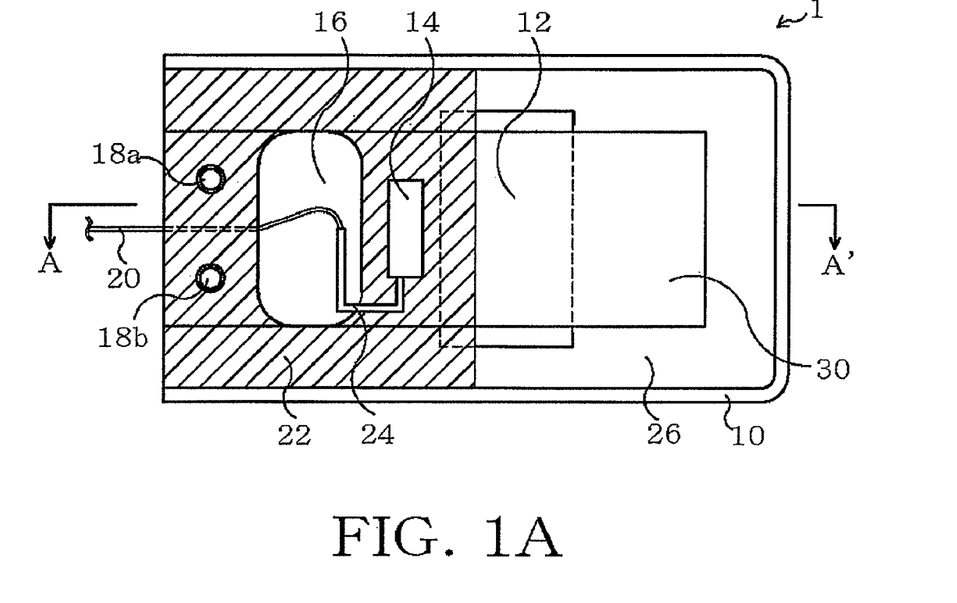
FIG. 1A is a top view showing the magnetic material detection device in embodiment 1 of the present invention.
Figure 1B:
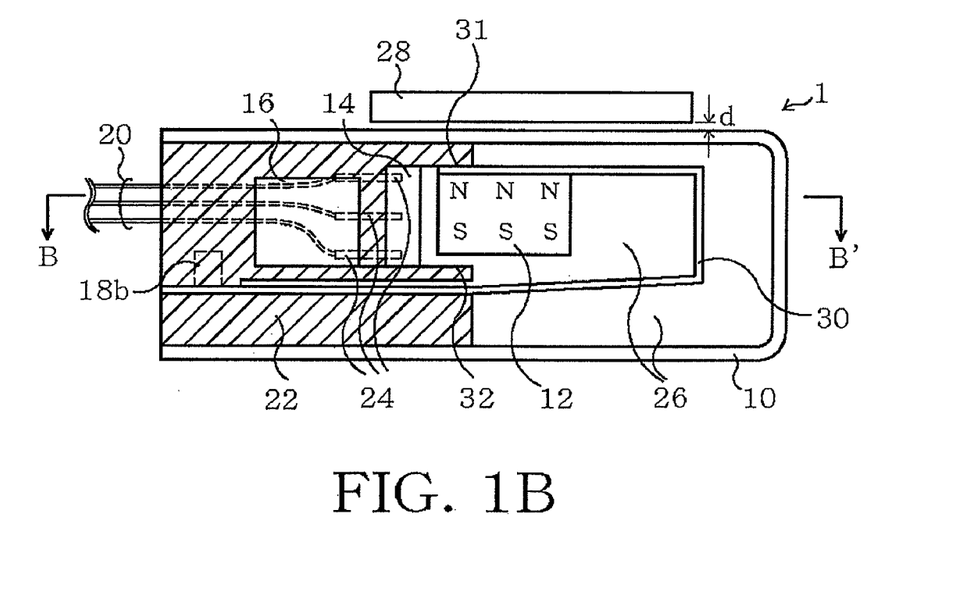
FIG. 1B is a sectional view showing the magnetic material detection device in embodiment 1 of the present invention wherein the magnet contacts the upper stopper.
Figure 1C:
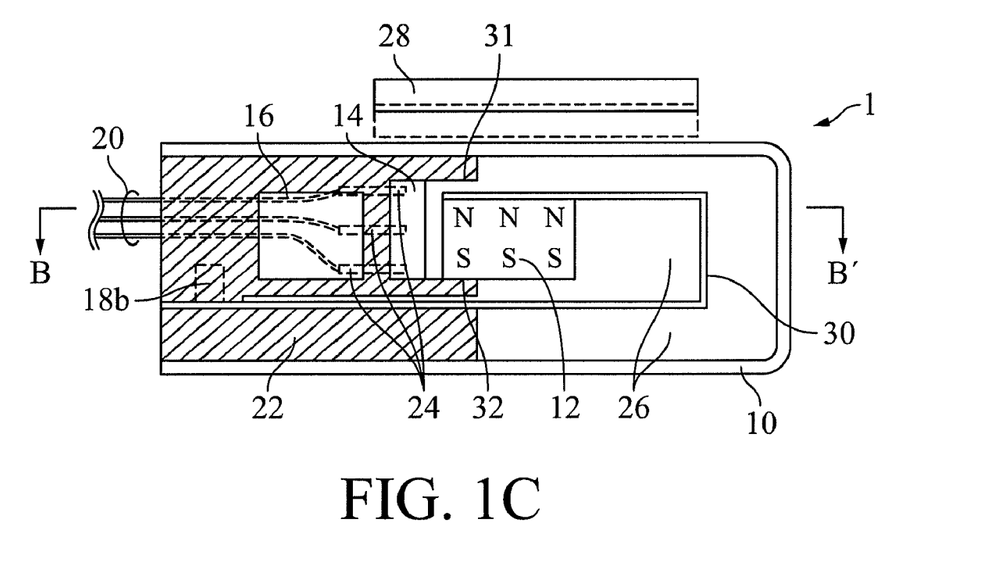
FIG. 1C is a sectional view showing the magnetic material detection device in embodiment 1 of the present invention wherein the magnet contacts the lower stopper.

FIG. 1A is a top view of the magnetic material detection device 1 in embodiment 1 of the present invention. FIG. 1B and FIG. 1C are respectively a sectional view of A-A' in FIG. 1A. FIG. 1B shows the state that the magnet 12 contacts upper stopper 31, and FIG. 1C the state that the magnet 12 contacts lower stopper 32. In FIG. 1B and FIG. 1C, an iron piece 28 (magnetic material) located outside the body of the magnetic material detection device 1 is added, but other material pieces such as nickel piece or cobalt piece which respond to the magnet are also detectable instead of the iron piece 28.

As shown in FIG. 1A, FIG. 1B and FIG. 1C, a case 10 contains the magnet 12, the Hall IC 14, mounting member 22 and others. Case 10 is made of metal or nonmagnetic material such as plastic. Mounting member 22 is sealed by covering opening of the case 10 to prevent air, water and oil from intruding into the case 10. Magnet 12 is displaceable to the side of iron plate 28 in FIG. 1B, in other words, the upper side of FIG. 1B. If the iron piece 28 gets into an area comprising a given distance "d" from the magnetic material detection device 1 as shown in FIG. 1B, resulting in that the iron piece 28 is relatively strongly magnetized, the magnet 12 is displaced to the side of the iron piece 28 by magnetic force. A "J-shaped" plate spring 30 which is an elastic body, as will be described hereinafter, controls the magnet 12 to contact the lower stopper 32 when the iron piece 28 is relatively far from the magnetic material detection device 1 as shown in FIG. 1C where the iron piece's position in FIG. 1B is shown in dotted line.

In other words, in case the iron piece 28 is relatively far from the magnetic material detection device 1 as shown in FIG. 1C, plate spring 30 functions to fix the magnet 12 to prevent lateral displacement in FIG. 1B. Plate spring 30 functions to return the magnet 12 to the position before displacement as shown in FIG. 1C, when the iron piece 28 is located relatively far from the magnetic material detection device 1 after the iron piece 28 is located relatively close to it.

In addition, displaceable position of the magnet 12 in lower part of FIG. 1B is limited by the lower stopper 32. Configuration of the magnet 12 may be a cube, a rectangular solid, a cylinder and others such that the magnet 12 has a side wall which is opposed to and parallel to the outer wall of the Hall IC 14. As an example, the magnet 12 is set in such a way that its north pole is upward in FIG. 1B and its south pole downward in FIG. 1B.

The Hall IC 14 includes detecting means for detecting displacement of the magnet 12 and output means for outputting detection signals in case displacement of the magnet 12 is detected. The Hall IC 14 is mounted on a mounting member 22, locating near the magnet 12 in the direction perpendicular to moving direction of the magnet 12. The Hall IC 14 comprises input/output pins 24 for inputting/outputting signals between external signal processing means (not shown).

A necessary through-hole is formed on the opening side of the case 10. External connection cables 20 to input/output signals between the Hall IC 14 and the signal processing means is put through the through-hole. The external connection cables 20 and input/output pins 24 are connected by flexible cables not shown in a space 16.

In addition, the magnet 12 is connected to a mounting member 22 via a plate spring 30. As an example, one end of the plate spring 30 is connected to the upper surface of the magnet 12, central part thereof passes through the lateral side (counter side to the Hall IC 14) and the lower surface side of the magnet 12 in the space 26, and the other end thereof is connected to the mounting member 22 near the space 16 by means of setscrews 18a and 18b.

Magnet 12 has contact with a lower side stopper 32 in case the iron piece 28 is relatively far from the magnetic material detection device 1. This is due to the fact that mutual attracting force between the iron piece 28 and the magnet 12 is weak, because the iron piece 28 is only weakly magnetized in cooperation with the magnet 12 when the iron piece 28 is relatively far from the magnetic material detection device 1. On the other hand, the magnet 12 is displaced upward in FIG. 1B in case the iron piece 28 is relatively near the magnetic material detection device 1. This is due to strong mutual attracting force between the iron piece 28 and the magnet 12, because the iron piece 28 is strongly magnetized in cooperation with the magnet 12.

Figure 2A:
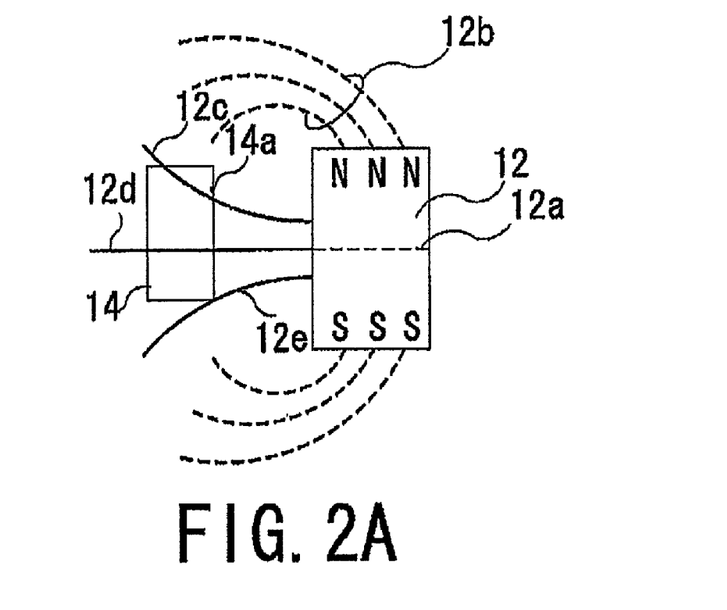
FIG. 2A is an enlarged view showing the magnet and a Hall device shown in FIG. 1 with the magnet before being displaced.
Figure 2B:
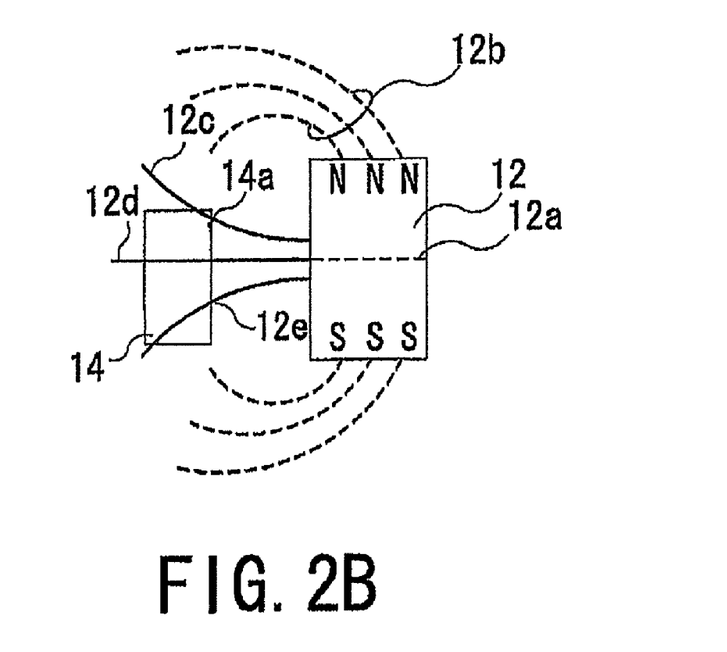
FIG. 2B is an enlarged view showing the magnet and a Hall device shown in FIG. 1 with the magnet after being displaced.

FIG. 2 is an enlarged view showing the magnet 12 and the Hall IC 14 shown in FIG. 1B. FIG. 2A shows the magnet 12 before being displaced and FIG. 2B shows the magnet 12 after being displaced. The magnet 12 is set such that isodynamic lines 12c crosses operating point 14a of the Hall IC 14 before and after the magnet 12 being displaced.

There are magnetic field lines 12b which connect the south pole and the north pole in a curve around the magnet 12. In addition, there are isodynamic lines 12c-12e passing through points where magnetic forces are the same. Each isodynamic line 12c-12e crosses perpendicularly with each magnetic field line 12b. Magnetic field line 12d corresponds to, for example, 0 gauss, and isodynamic lines 12c and 12e, for example, respectively to 25 gauss. In addition, strength of magnetic force of the magnetic field line increases leaving from the boundary 12a of the south and north poles.

As shown in FIG. 2A, before displacement of the magnet 12, for example, 25 gauss isomagnetic plane 12c on the north pole side of the magnet 12 is located below the operating point 14a of the Hall IC 14. In this case, the Hall IC 14 is in an off-state and no detection signal is output from the Hall IC 14.

On the other hand, as shown in FIG. 2B, after the magnet 12 is displaced, for example, 25 gauss isomagnetic plane 12c on the north pole side of the magnet 12 is located above the operating point 14a of the Hall IC 14. In this case, the Hall IC 14 is in an on-state and detection signals are output from the Hall IC 14. After that, when the iron piece 28 is located relatively far, the magnet 12 returns to the state before the displacement.

If the Hall IC 14 is set reversely, the detection signal is output from the Hall IC 14 under the state shown in FIG. 2A, not from the Hall IC 14 under the state shown in FIG. 2B.

Actually, only a few μms displacement of the magnet 12 enables high-sensitivity that switching between output of the detection signal and no output thereof can be detected. Therefore, space for displacement of the magnet 12 in the case 10 is little needed, so reduction in size, weight and thickness of the magnetic material detection device 1 is realized.

Figure 3:
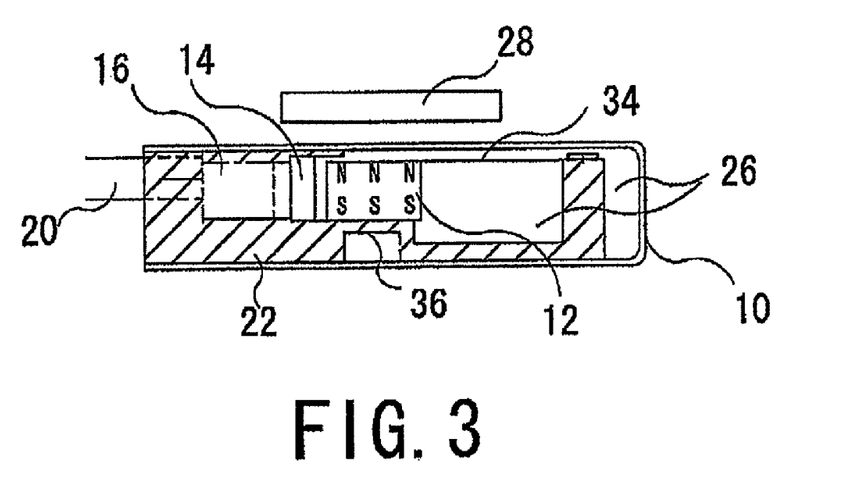
FIG. 3 is a sectional view showing the magnetic material detection device in embodiment 2 of the present invention.

FIG. 3 is a sectional view showing the magnetic material detection device 1 in embodiment 2 of the present invention. In this embodiment, the magnetic material detection device 1 comprises a nickel-plated plate 36 and a support plate 34 which are a returning means as a substitute for the plate spring 30. The nickel-plated plate 36 is located at the lower side of the magnet 12. The magnet 12 is fixed on the lower side of FIG. 3 by magnetizing the nickel-plated plate 36 in cooperation with the magnet 12. Another iron piece which is smaller than the iron piece 28 can be set as a substitute for the nickel-plated plate 36.

A support plate 34 is mounted, for example, on the upper surface of the magnet 12. Stainless steel such as SUS 30 or polyimide plate can be used for the support plate 34. A magnetic material detection device 1 in this embodiment has a merit of long life span in comparison with the magnetic material detection device 1 in embodiment 1, because the nickel-plated plate 36 and the support plate 34 are less deteriorative than the plate spring 30.

Figure 4:
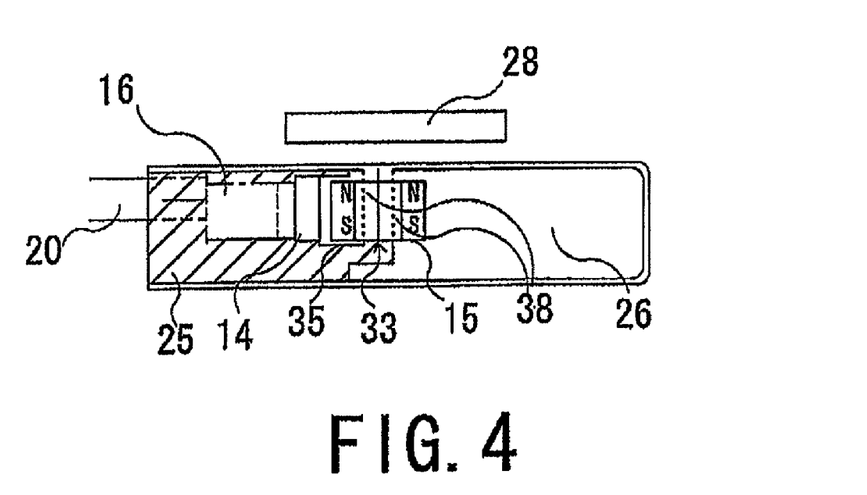
FIG. 4 is a sectional view showing the magnetic material detection device in embodiment 3 of the present invention.

FIG. 4 is a sectional view showing the magnetic material detection device 1 in embodiment 3 of the present invention.

In this embodiment, the magnetic material detection device 1 comprises a spring 38 and a guide 35 which are returning means as the substitute for the plate spring 30. In addition, the magnetic material detection device 1 comprises a pipe-shaped magnet 15 as the substitute for the magnet 12 shaped as a rectangular solid or others.

One end of the spring 38 is mounted on upper inner wall of the magnetic material detection device 1 and the other end is mounted in the pipe of the magnet 15. In case the iron piece 28 is relatively far from the magnetic material detection device 1, the spring 38 extends and the magnet 15 is fixed on the lower side of FIG. 4.

A guide 35 is formed integral with a strut 33 with a diameter slightly shorter than the inside diameter of the magnet 15. The magnet 15 is embedded into the strut 33. The length of the strut 33 is arranged greater than displacement of the magnet 15. A support plate can be mounted on the magnet 15 as the substitute for the guide 35 as explained in embodiment 2.

In the magnetic material detection device 1 of the present embodiment, neither the set plate spring 30 nor the nickel-plated plate 36 is needed to be provided, so the device can reduce its thickness more than the magnetic material detection device 1 of embodiments 1 and 2 can.

Figure 5A:
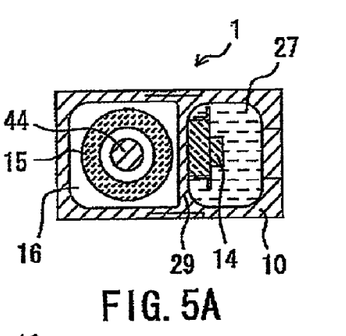
FIG. 5A is a top view of the magnetic material detection device in embodiment 4 of the present invention.
Figure 5B:
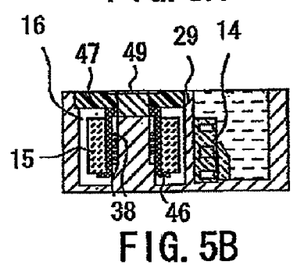
FIG. 5B is a sectional view of the magnetic material detection device in embodiment 4 of the present invention.
Figure 5C:
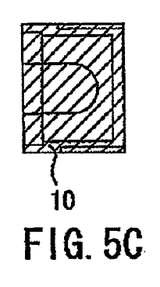
FIG. 5C is a side view of the magnetic material detection device in embodiment 4 of the present invention.
Figure 5D:
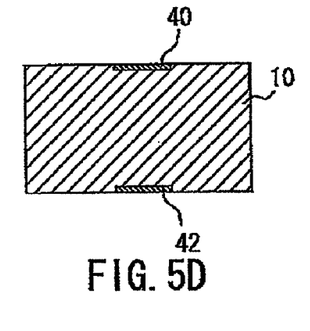
FIG. 5D is a base view of the magnetic material detection device in embodiment 4 of the present invention.
Figures 5E, 5F:
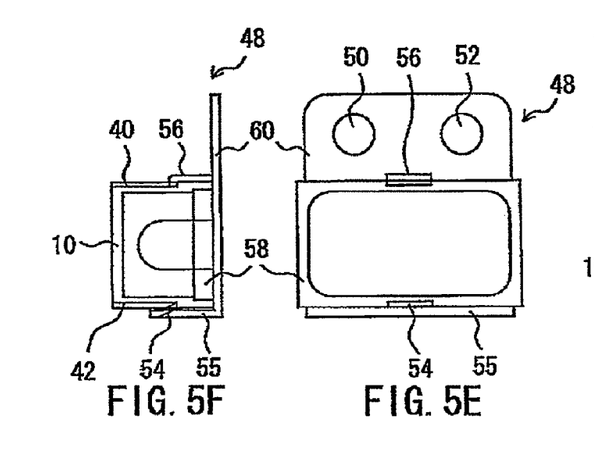
FIG. 5E is a top view of the magnetic material detection device in embodiment 4 of the present invention.
FIG. 5F is a side view of the magnetic material detection device in embodiment 4 of the present invention.

FIG. 5A is a top view showing the magnetic material detection device 1 in embodiment 4 of the present invention. FIG. 5B is a sectional view of FIG. 5A. FIG. 5C is a side view of FIG. 5A. FIG. 5D is a base view of FIG. 5A. FIG. 5E is a top view of a mounting 48 connected to the magnetic material detection device 1. FIG. 5F is a side view of FIG. 5E.

In this embodiment, the magnetic material detection device 1 comprises the strut 44, the spring 38 and others as the substitute for the plate spring 30 to reduce size and weight. The strut 44 extends from bottom surface to top surface of the case 10 in the space 16 and is formed integral with the case 10. A bump is formed on the side of the strut 44 to catch one end of the spring 38.

The spring 38 comprising a slightly longer inside diameter than the outside diameter of the strut 44 is located around the strut 44. A magnet receiver 46 made of plastic comprising a slightly longer inside diameter than the outside diameter of spring 38 is located around the spring 38. Around the magnet receiver 46, the magnet 15 comprising a slightly longer inside diameter than the outside diameter of the magnet receiver 46 is mounted, for example, the north pole on the upper side of the figure and the south pole on the lower side of the figure. The magnet 15 is surrounded by one of side walls of the case 10 in the short length direction, a part of both side walls of the case 10 in the long length direction, and the first side of a partition wall 29 which defines the space 16.

Bottom of the magnet receiver 46 is curved out to catch one end of the magnet 15 and a through-hole is formed at the top part of the magnet receiver 46 to pass the strut 44. The inside diameter of the through-hole is slightly longer than the outside diameter of the strut 44, so that the magnet receiver 46 can slide up and down.

The upper part of the case 10 is fit with a top cover 47 made of the same material as the case which has an opening comprising a slightly longer inside diameter than the outside diameter of the strut 44. A strut bracket 49 is fit into the opening of the top cover 47. Then, the top cover 47 and the strut bracket 49 are bonded on the case 10 with adhesive or others to block air and others from the space 16. In addition, the Hall IC 14 is mounted on the second side of a partition wall 29 and neighborhood thereof is filled with resin to block air and others.

As shown in FIG. 5C, an opening to draw out the connection cable 20 is formed on the shorter side of the case 10 facing the Hall IC 14. As shown in FIG. 5D, grooves 40 and 42 are formed on the longer side of the case 10. A mounting 48 is connected to grooves 40 and 42 as shown in FIG. 5E and FIG. 5F so that the case 10 can be mounted on the required member.

The mounting 48 comprises a placing part 58 where the case 10 is placed, a base part 60 which extends to one longer side of the placing part 58, a case gripping part 54 which extends vertically from the boundary area of the placing part 58 and the base part 60, a case gripping part 56 which extends vertically from the other longer side of the placing part 58 and a stopper 55 formed in the central part of the case gripping part 56. The mounting 48 is made of stainless steel, for example.

Central part of the placing part 58 is hollowed out to trim weight. Screw holes 50 and 52 are formed on the base part 60. A case gripping part 55 comprises the stopper 54 by forming cutout in the central part to be accommodated in the groove 42. The tip end of the case gripping part 56 is bent inwardly such that it can be accommodated in the groove 40.

In case the iron piece 28 is relatively far from the magnetic material detection device 1, the top surface of the magnet receiver 46 is in contact with the bottom surface of the top cover 47. In case the iron piece 28 is relatively close to the magnetic material detection device 1 (where the iron piece 28 is located within a predetermined distance on the lower side of FIG. 5B), the magnet receiver 46 is displaced downward in FIG. 5B, parting from the top cover 47, the spring 38 being pressed.

Here, the magnet 15 is mounted on the magnet receiver 46, so the magnet 15 is displaced downward as the magnet receiver 46 displaces. Therefore, the Hall IC 14 changes from "off" to "on".

In the magnetic material detection device 1 in the present embodiment, further downsizing can be realized compared with one in embodiment 1 because the space 26 is eliminated.

Figures 6A, 6B:
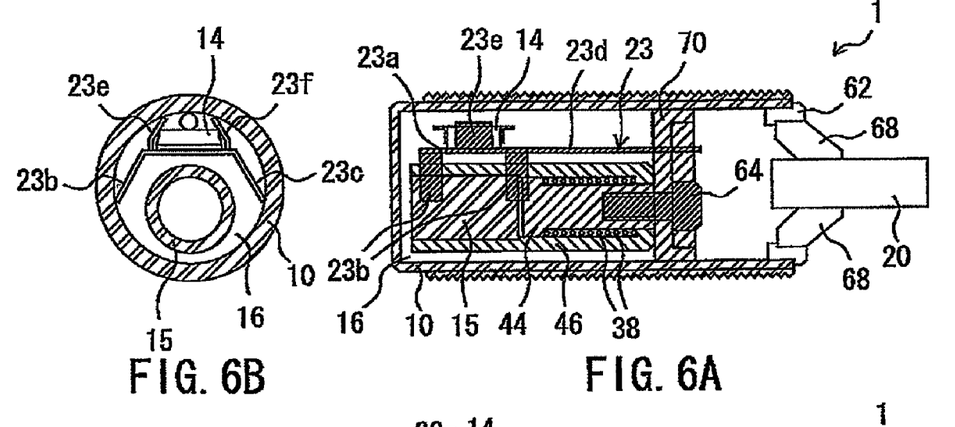
FIG. 6A is a sectional view showing the magnetic material detection device in embodiment 5 of the present invention.
FIG. 6B is a first side view showing the magnetic material detection device in embodiment 5 of the present invention.
Figure 6C:
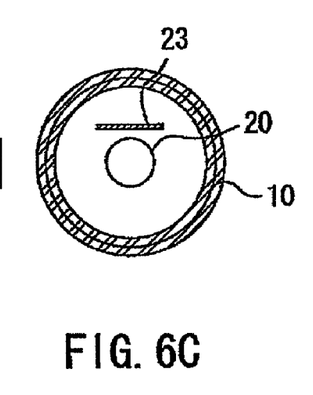
FIG. 6C is a second side view showing the magnetic material detection device in embodiment 5 of the present invention.
Figure 7A:
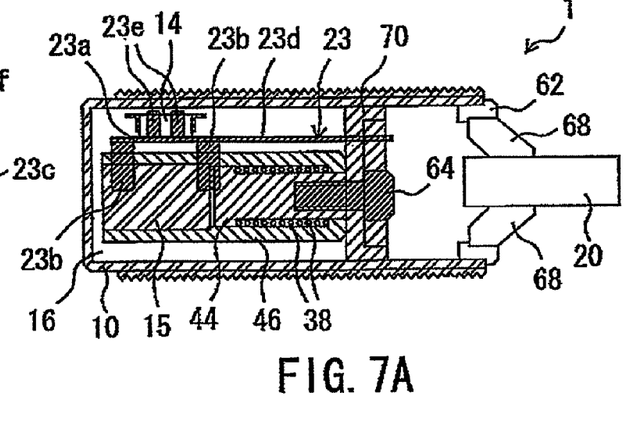
FIG. 7A is a deformed sectional view showing the magnetic material detection device in embodiment 5 of the present invention.
Figure 7B:
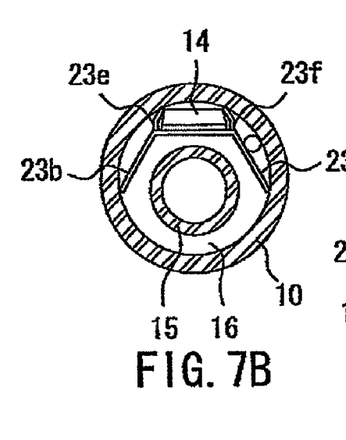
FIG. 7B is a deformed first side view showing the magnetic material detection device in embodiment 5 of the present invention.
Figure 7C:
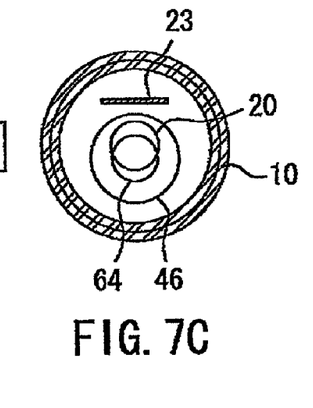
FIG. 7C is a deformed second side view showing the magnetic material detection device in embodiment 5 of the present invention.

FIG. 6A is a sectional view of the magnetic material detection device 1 in embodiment 5 of the present invention. FIG. 6B is the first side view of FIG. 6A. FIG. 6C is the second side view of FIG. 6A. FIG. 7A-7C show deformed embodiments of FIG. 6A-6C.

An outer wall is thread-cut and the cylindrical stainless case 10 is prepared in the present embodiment. Magnetic material detection device 1 can be fixed on a mounting body formed an opening, by inserting the magnetic material detection device 1 through the opening and then tightening nuts from both ends of the magnetic material detection device 1.

A step is formed on the inner wall of the case 10. A disk-like magnet holding member 70 made of plastic is depressed and pushed to the step. A circumferential part of the magnet holding member 70 rises toward the opening. A semicylindrical cutout is formed from the central part, to house the end of a stainless gripping member 23 which grips the Hall IC 14. Furthermore, a screw hole to insert screw 64 is formed through the magnet holding member 70, at a point distant from the center.

The gripping member 23 includes
a main body part 23*d* which is long in the direction of the shaft of the case 10
a placing part 23*a* where the Hall IC 14 is placed
the first and second auxiliary parts 23*e* and 23*f* bent to the Hall IC 14 side against the main body part 23*d* to regulate the placing position of the Hall IC 14, and
pressing part 23*b* and 23*c* bent at a predetermined angle against the main body part 23*d* to regulate the position of the Hall IC 14 in the direction of the case diameter by pressing the inner wall of the case 10

At first, adhesive is applied to the placing part 23a or the Hall IC 14 when the gripping member 23 is mounted on the Hall IC 14. Then, the Hall IC 14 and the placing part 23a are adhered each other on the surface coated with adhesive and the adhesive is dried. In this case, the positioning of the Hall IC 14 is retained by the first and second auxiliary parts 23e and 23f, so it's not necessary to carry out troublesome work of strict position-matching. Here, a flexible cable connected to input/output pin 24 is passed through the upper side of the Hall IC 14, as shown in FIG. 6B.

In addition, a screw receiver is formed at the base part, and the mushroom-shaped plastic strut 44 with a large head and a cylindrical leg is connected on the magnet holding member 70 by a screw 64. A spring 38 comprising an inside diameter slightly longer than the outside diameter of the leg is located around the leg of the strut 44. A plastic cylindrical magnet receiver 46 comprising an inside diameter slightly longer than the outside diameter of spring 38 and the head of the strut 44 is located around the spring 38.

The magnet 15 is pressed on one end of the magnet receiver 46, and a claw part whose outer wall is tapered and whose inner wall is extended inwardly is formed on the other end. The inside diameter of the claw part is slightly longer than the outer circumference of the leg of the strut 44. In case the iron piece 28 is relatively far from the magnetic material detection device 1, the outer lateral wall of the claw part is in contact with the magnet holding member 70. The inner lateral wall of the claw part is in contact with one end of the spring 38, and the other end of the spring 38 is in contact with the bottom of the leg of the strut 44.

When the iron piece 28 is relatively close to the magnetic material detection device 1 (here, when the iron piece 28 is located within a predetermined distance on the left side of FIG. 6A), the magnet receiver 46 and the magnet holding member 70 are separated, spring 38 is pressed and displaced to the left side of FIG. 6A, and the Hall IC 14 is turned on, as stated above.

In addition, a rubber packing 68 to cover the external connection cable 20 and a packing receiver 62 to connect the rubber packing 68 and the opening of the case 10 is mounted on the opening side of the case 10 to protect the Hall IC 14 from dust and others.

In addition, flexible cable connected to input/output pin 24 is passed through the side of the second auxiliary part 23f, as shown in FIG. 7B. In this case, the diameter of the case 10 can be shortened because some dead space can be reduced, for example, eccentric distance of the magnet 15 and others are shortened in comparison with the magnetic material detection device 1 shown in FIG. 6.

Figure 8A:
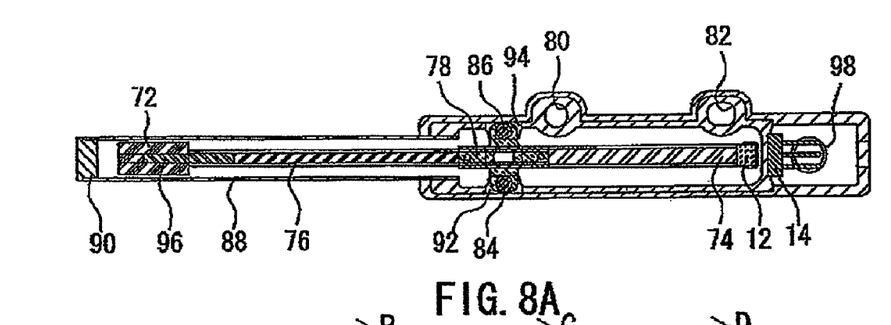
FIG. 8A is a top view showing the magnetic material detection device in embodiment 6 of the present invention.
Figure 8B:
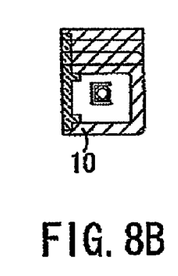
FIG. 8B is a top view showing the magnetic material detection device in embodiment 6 of the present invention.
Figure 8C:
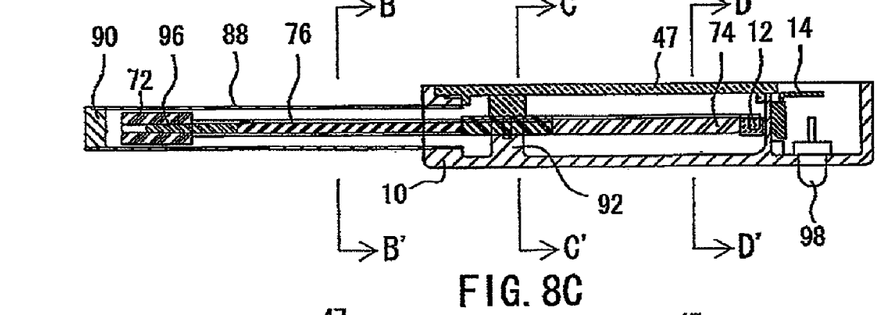
FIG. 8C is a side view showing the magnetic material detection device in embodiment 6 of the present invention.
Figure 8D:
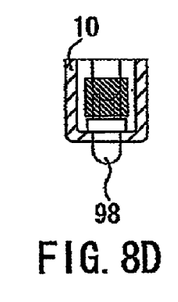
FIG. 8D is a sectional view showing the magnetic material detection device in embodiment 6 of the present invention.
Figure 8E:
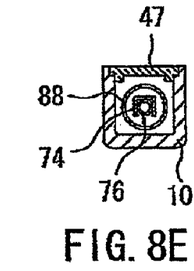
FIG. 8E is a sectional view showing the cross section of plane B-B$^1$ of FIG. 8C.
Figure 8F:
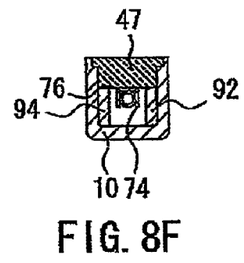
FIG. 8F is a sectional view showing the cross section of plane C-C$^1$ of FIG. 8C.
Figure 8G:
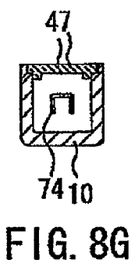
FIG. 8G is a sectional view showing the cross section of plane D-D$^1$ of FIG. 8C.
Figure 9A:
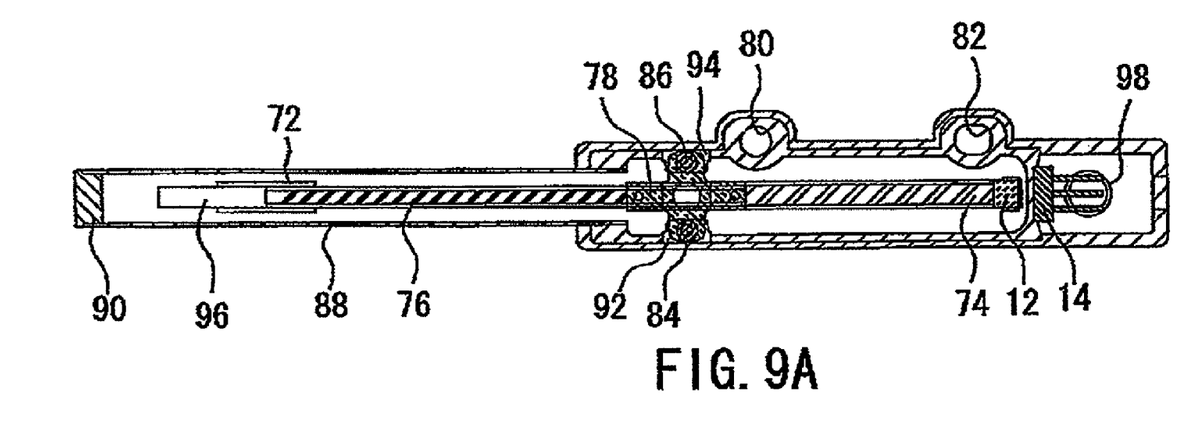
FIG. 9A is a side-view diagram showing an example of the modified device shown in FIG. 8.
Figure 9B:
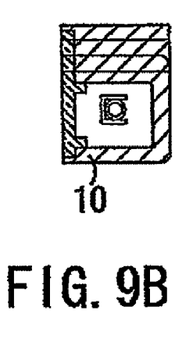
FIG. 9B is an end-view diagram showing an example of the modified device shown in FIG. 8.

FIG. 8A is a top view showing the magnetic material detection device 1 in embodiment 6 of the present invention. FIG. 8B is a side view of FIG. 8A. FIG. 8C is a sectional view of FIG. 8A. FIG. D is a side view of FIG. 8C. FIG. 8E to 8G are sectional views of B-B', C-C' and D-D' shown in FIG. 8C. FIGS. 9A and 9B are modified examples of FIGS. 8A and 8B.

Screw holes 80 and 82 are used in the present embodiment to mount the case 10 on a required member by screws. In addition, not only the magnet 12 to switch on/off the Hall IC 14, but also the second magnet 72 to attract with the iron piece 28 is provided. The second magnet 72 is pipe-shaped, the upper side of FIG. 8C is the north pole, and the lower side is the south pole. Magnets 12 and 72 are respectively mounted on each end of a stainless arm 74 and a first pipe 76. Arm 74 whose cross section is a U shape is rectangular-shaped. The first pipe 76 is a cylinder with an outside diameter which is confined within the arm 74.

The other ends of the arm 74 and the first pipe 76 are coupled so that the first pipe 76 is confined within the arm 74. A polyimide cross-like support plate 78 comprising a hole in the central part is positioned on the top of the coupling part, and then connected to it by adhesion or others. The supporting plate 78 is formed such that the side parallel to the arm 74 (the side mounted on the arm 74) is the same in width as the arm 74 and the same in length as the coupling part, forming two alignment marks.

The support plate 78 is formed such that the side perpendicular to the arm 74 is the same in width as the longer side of screw receivers 92 and 94, and as the distance between inner walls of the case 10 in the short side direction, where two screw holes are formed. Then, the support plate 78 is mounted on the case 10 by screws 84 and 86 using the screw holes. In this case, the arm 74 and the first pipe 76 are set parallel with the case 10 and the second pipe 88. Therefore, the arm 74 and the first pipe 76 are hung by the support plate 78. When the iron piece is relatively close to the magnet 72, the magnet 72 and the iron piece 28 attract each other. In this way, the arm 74 and the first pipe 76 incline to the case 10 and the second pipe 88 by means of the support plate 78 as a fulcrum, and the Hall IC 14 turns on.

In addition, an opening to mount the stainless second pipe 88 which contains the first pipe 76 is formed on the first side in the short side direction of the case 10. An opening to draw out the external connection cable 20 is formed on the second lateral side. The inside diameter of the second pipe 88 is longer than the outside diameter of the magnet 72. A coupling part 96 is pressed respectively inside the magnet 72 and the first pipe 76, being coupled through the coupling part 96. A stainless cap 90 is fixed on the tip of the second pipe 88.

In addition, there is an LED 98 to inform on/off of the Hall IC 14 on the bottom surface of the case 10 near the Hall IC 14. The cathode and the anode of LED 98 are respectively, electrically, connected to, for example, the positive power source terminal and the output terminal of the Hall IC 14. When output signal from the output terminal is off (in other words, at a high level), there is no potential difference between the positive power source terminal and the output terminal, so no current is applied to LED 98. On the other hand, when output signal from the output terminal is on, (in other words, at a low level), a potential difference is generated between the positive power source terminal and the output terminal, so current is applied to the LED 98.

The LED 98 may be provided in the external connection cable 20, thereby reducing size and weight. In addition, the LED 98 may be provided in the magnetic material detection device 1 shown in FIG. 1 and others.

Figure 10:
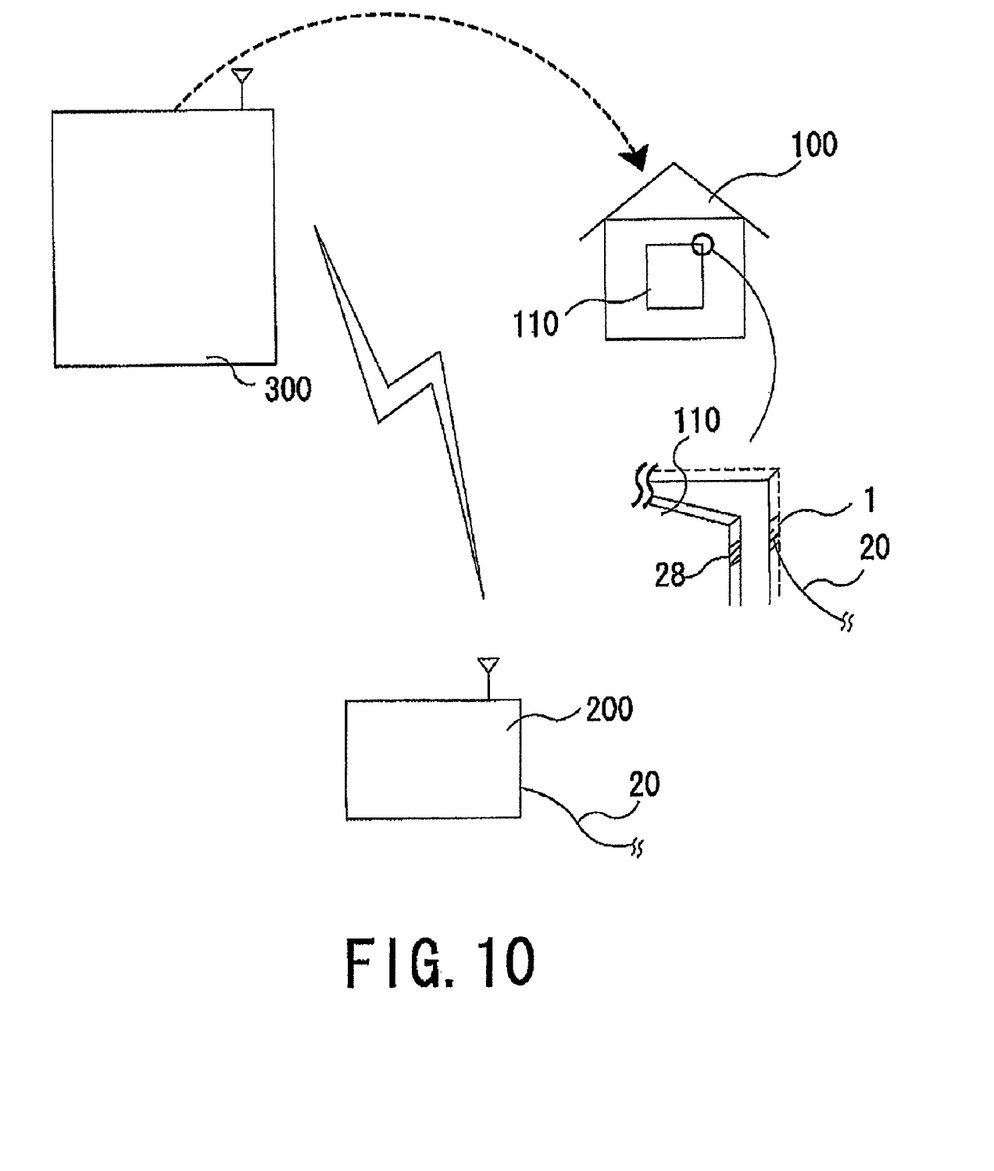
FIG. 10 is a typical block diagram showing the mobile object detection system in embodiment 7 of the present invention.

FIG. 10 is a typical block diagram showing a mobile object detection system in embodiment 7 of the present invention. FIG. 10 describes an example using the magnetic material detection device 1 explained in embodiments 1 to 6 for a home security system in the present embodiment.

In the present embodiment, when the magnetic material detection device 1 and the iron piece 28 is relatively close, detection signals are not output. When the magnetic material detection device 1 and the iron piece 28 are relatively far, detection signals are output.

FIG. 10 shows the following:
a building 100 such as a house, an office and others
the iron piece 28 mounted on a door 110 of a building 100
the magnetic material detection device 1 mounted at a position corresponding to the iron piece 28 when the door 110 is shut
a transmitting device 200 to transmit detection signals from the magnetic material detection device 1, and a security center 300 to receive detection signals transmitted from the transmitting device 200 and to make to dispatch guards and others to the building 100.

Mounting positions of the iron piece 28 and the magnetic material detection device 1 are reversible.

For example, when one leaves the building 100, if he/she closes the door 110 after setting the security system to operate by a predetermined operation, the iron piece 28 and the magnetic material detection device 1 will be located relatively close. If the door 110 is opened in this situation, the distance between the iron piece 28 and the magnetic material detection device 1 will relatively increase gradually, and magnetic force worked by the iron piece 28 will weaken. When the iron piece 28 reaches a predetermined distance from the magnetic material detection device 1 after that, the magnet built in the magnetic material detection device 1 is displaced. For this reason, it is possible to detect that the door 110 is opened on the principle explained in embodiment 1 and others.

Then, if one does not reset stopping the security system within a predetermined time after opening the door 110, detection signals will be output from the magnetic material detection device 1 to a transmitting device 200 through the external connection cable 20. A transmitting device 200 inputs the detection signal which is output from the magnetic material detection device 1, and transmits it to a security center 300, after adding unique ID information whose source is assigned to the building 100 to it. The security center 300 receives the detection signal transmitted from the transmitting device 200, identify the building 100 where the source transmitting device 200 of the detection signal is set from the ID information added to the detection signal and makes to dispatch guards and others to the building 100.

The home security system in the present embodiment especially using the thin the magnetic material detection devices 1 explained in embodiments 3-5 has an advantage that it is hard for one to see the external connection cable 20, etc., enabling to realize a neat appearance.

Figure 11:
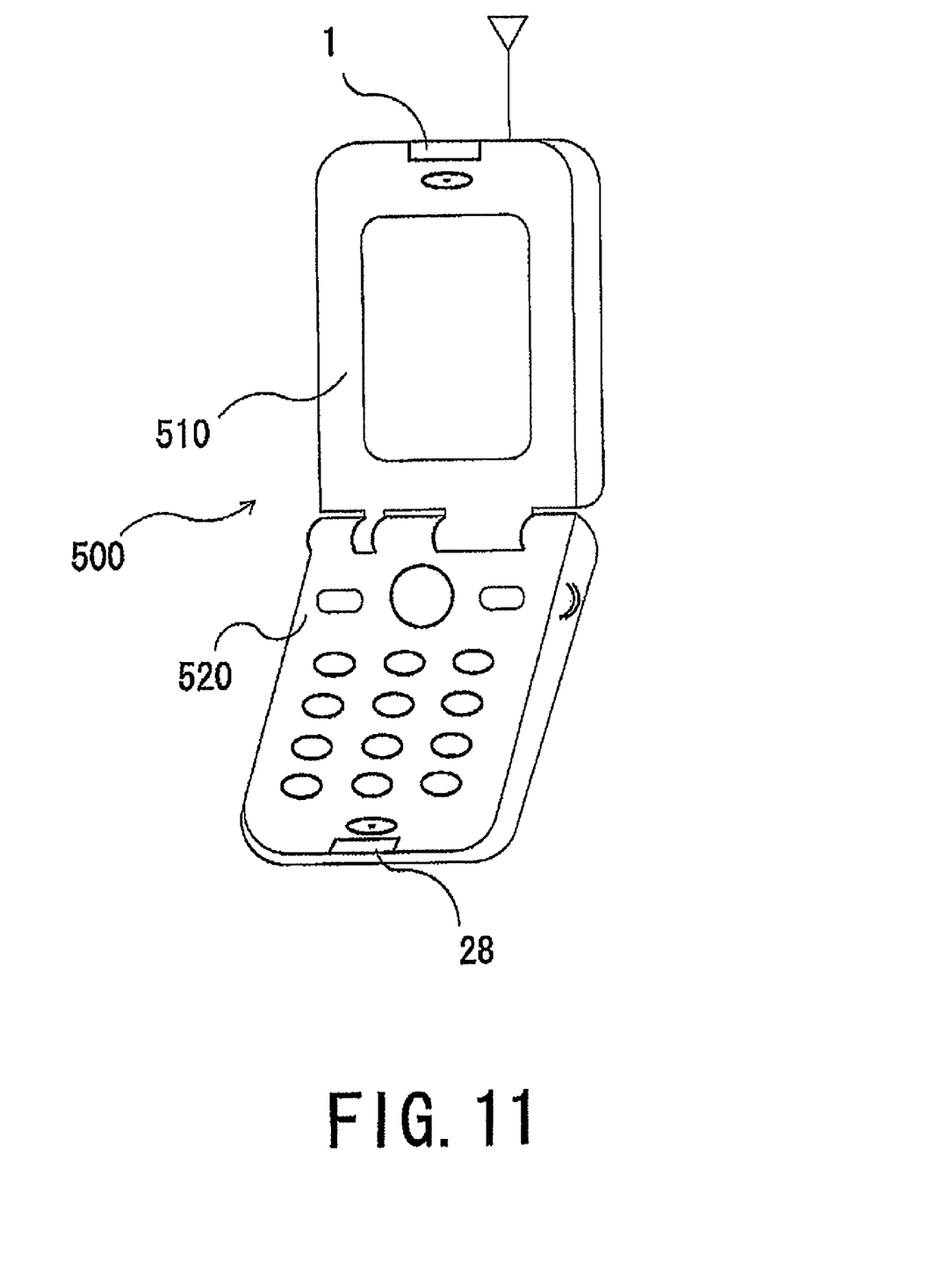
FIG. 11 is a typical block diagram showing the mobile object detection system in embodiment 8 of the present invention.

FIG. 11 is a typical block diagram showing a mobile object detection system in embodiment 8 of the present invention. The present embodiment is explained with the example of a cellular phone 500 using the magnetic material detection devices 1 explained in embodiments 1-6. In the present embodiment, also, when the magnetic material detection devices 1 and the iron piece 28 are relatively close, detection signals are not output, and when the magnetic material detection devices 1 and the iron piece 28 are relatively far, detection signals are output.

FIG. 11 shows a folding cellular phone 500 comprising the first member 510 and the second member 520 which are hinge-connected. Here, the magnetic material detection device 1 is mounted on the end of the first member 510 and the iron piece 28 is mounted on the end of the second member 520. Mounting positions of the magnetic material detection device 1 and the iron piece 28 are reversible.

When the first member 510 and the second member 520 are closed, the magnetic material detection device 1 and the iron piece 28 are located relatively close. When the first member 510 and the second member 520 are open, the magnetic material detection device 1 and the iron piece 28 are located relatively far. Therefore, opening/closing of the first member 510 and the second member 520 are detective based on the principle explained in embodiment 1 and others. In the present embodiment, This detection of opening and closing can switch on/off, for example, a silent mode, an automatic answering telephone function, a talk key and others.

Specifically, for example, switching on/off the silent mode and others are conducted every time the first member 510 and the second member 520 are opened/closed. In addition, it is arranged that if the first member 510 and the second member 520 are opened when a call is incoming, a user can make a phone call. In this way, users of the cellular telephone can simply open/close the first member 510 and the second member 520 instead of pressing silent mode keys or talk keys, thereby operability of the cellular telephone being improved.

The present inventory may be applied not only to examples explained in embodiments 7 and 8 but also to the following examples:
- a door switch which detects opening/closing of an automobile door
- an elevator system which controls stop positions of an elevator
- a position control system of an arm which controls the position of robot arms and others of industrial machines or nursing devices
- a disconnection detection system which detects the disconnection of piano wires and others, etc.

The invention claimed is:

1. A magnetizable material detection device for detecting a magnetizable material which can be magnetized by a magnet comprising:
   a first magnet displaceable in the direction of its magnet poles;
   a Hall device for detecting displacement of the first magnet, having an operating point corresponding to a given magnetic force wherein the on/off state of the Hall device depends on the strength of the magnetic force of the first magnet at the operating point against the given magnetic force;
   wherein the first magnet and the Hall device are disposed such that when a boundary line of the first magnet poles crosses the operating point, the on/off state of the Hall device changes;
   a second magnet, being different from the first magnet, for attracting the magnetizable material; and
   a supporting member, hung by a support plate, for supporting the first magnet and the second magnet whose one end is connected to the first magnet and whose other end is connected to the second magnet;
   wherein when the magnetizable material is displaced within a predetermined distance from the body of the detection device the second magnet attracts the magnetizable material to cause the supporting member to be inclined so that the boundary line of the first magnet poles crosses the operating point of the Hall device and the on/off state of the Hall device changes, by which the minute displacement of the magnetizable material is detected.

2. A magnetizable material detection device according to claim 1, wherein the supporting member comprises an arm and a pipe, and the arm and the pipe are coupled so that the pipe is confined within the arm.

3. A magnetizable material detection device according to claim 1, further comprising a means for visually indicating the on/off state of the Hall device.

4. A magnetizable material detection device according to claim 1, wherein the configuration of the magnet is any one of a cube, a rectangular solid, a cylinder or a pipe.

5. A mobile object detection system comprising the magnetizable material detection device according to claim 1 and the mobile object comprising the magnetizable material.

6. A magnetizable material detection device for detecting minute displacement of a magnetizable material which can be magnetized by a magnet comprising:

a first magnet displaceable in the direction of its magnet poles;

a Hall device having an operating point corresponding to a given magnetic force wherein the on/off state of the Hall device depends on the strength of the magnetic force of the first magnet at the operating point against the given magnetic force;

wherein the first magnet and the Hall device are disposed such that when an isomagnetic plane of the given magnetic force of the first magnet pole crosses the operating point, the on/off state of the Hall device is reversed;

a second magnet, being different from the first magnet, for attracting the magnetizable material; and a supporting member, hung by a support plate, for supporting the first magnet and the second magnet whose one end is connected to the first magnet and whose other end is connected to the second magnet;

wherein when the magnetizable material is displaced within a predetermined distance from the body of the detection device, the second magnet attracts the magnetizable material to cause the supporting member to be inclined so that the isomagnetic plane crosses the operating point of the Hall device and the on/off state of the Hall device is reversed, by which the minute displacement of the magnetizable material is detected.

* * * * *